US009852084B1

(12) United States Patent
Soderquist et al.

(10) Patent No.: US 9,852,084 B1
(45) Date of Patent: Dec. 26, 2017

(54) ACCESS PERMISSIONS MODIFICATION

(71) Applicant: Apple Inc., Cupertino, CA (US)

(72) Inventors: Peter G. Soderquist, Milford, MA (US); Pradeep Kanapathipillai, Santa Clara, CA (US); Bernard J. Semeria, Palo Alto, CA (US); Joshua P. de Cesare, Campbell, CA (US); David J. Williamson, Austin, TX (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 15/017,427

(22) Filed: Feb. 5, 2016

(51) Int. Cl.
*G06F 12/14* (2006.01)
*G06F 12/1009* (2016.01)

(52) U.S. Cl.
CPC ...... *G06F 12/1483* (2013.01); *G06F 12/1009* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 4,376,297 A | 3/1983 | Anderson et al. | |
| 5,434,992 A | 7/1995 | Mattson | |
| 5,584,014 A | 12/1996 | Nayfeh et al. | |
| 5,802,602 A | 9/1998 | Rahman et al. | |
| 6,421,761 B1 | 7/2002 | Arimilli et al. | |
| 6,516,387 B1 | 2/2003 | Auracher | |
| 6,629,208 B2 | 9/2003 | Sturges et al. | |
| 6,865,647 B2 | 3/2005 | Olarig et al. | |
| 7,120,651 B2 | 10/2006 | Bamford et al. | |
| 7,415,575 B1 | 8/2008 | Tong et al. | |
| 8,108,650 B2 | 1/2012 | Petolino, Jr. | |
| 2003/0217229 A1 | 11/2003 | Rowlands et al. | |
| 2016/0110298 A1* | 4/2016 | Koufaty | G06F 12/1466 726/28 |
| 2016/0350019 A1* | 12/2016 | Koufaty | G06F 3/0622 |

* cited by examiner

*Primary Examiner* — Kevin Verbrugge
(74) *Attorney, Agent, or Firm* — Rory D. Rankin; Meyertons, Hood, Kivlin, Kowert & Goetzel, P.C.

(57) ABSTRACT

Systems, apparatuses, and methods for modifying access permissions in a processor. A processor may include one or more permissions registers for managing access permissions. A first permissions register may be utilized to override access permissions embedded in the page table data. A plurality of bits from the page table data may be utilized as an index into the first permissions register for the current privilege level. An attribute field may be retrieved from the first permissions register to determine the access permissions for a given memory request. A second permissions register may also be utilized to set the upper and lower boundary of a region in physical memory where the kernel is allowed to execute. A lock register may prevent any changes from being made to the second permissions register after the second permissions register has been initially programmed.

20 Claims, 12 Drawing Sheets

200

CPU 202

MMU 205

First TLB 210

Second TLB 215

HTW 220

Permissions Registers 222

Fabric/ Memory Controller 225

Memory 230

Page Tables 235

500

| Attribute[N] | Attribute Index [3:0] 505 | | | | Programmed Value for Privilege Level 1 510 | | | Programmed Value for Privilege Level 0 515 | | |
|---|---|---|---|---|---|---|---|---|---|---|
| | | | | | R | W | X | R | W | X |
| Attribute 0 | 0 | 0 | 0 | 0 | 0 | 0 | 1 | 0 | 0 | 0 |
| Attribute 1 | 0 | 0 | 0 | 1 | 0 | 0 | 1 | 0 | 0 | 0 |
| Attribute 2 | 0 | 0 | 1 | 0 | 1 | 1 | 0 | 0 | 0 | 1 |
| Attribute 3 | 0 | 0 | 1 | 1 | 1 | 1 | 0 | 0 | 0 | 0 |
| Attribute 4 | 0 | 1 | 0 | 0 | 1 | 1 | 0 | 1 | 1 | 1 |
| Attribute 5 | 0 | 1 | 0 | 1 | 1 | 1 | 0 | 1 | 1 | 0 |
| Attribute 6 | 0 | 1 | 1 | 0 | 1 | 1 | 0 | 1 | 1 | 1 |
| Attribute 7 | 0 | 1 | 1 | 1 | 1 | 1 | 0 | 1 | 1 | 0 |
| Attribute 8 | 1 | 0 | 0 | 0 | 0 | 0 | 1 | 0 | 0 | 0 |
| Attribute 9 | 1 | 0 | 0 | 1 | 0 | 0 | 1 | 0 | 0 | 0 |
| Attribute 10 | 1 | 0 | 1 | 0 | 1 | 0 | 0 | 0 | 0 | 1 |
| Attribute 11 | 1 | 0 | 1 | 1 | 1 | 0 | 0 | 0 | 0 | 0 |
| Attribute 12 | 1 | 1 | 0 | 0 | 0 | 0 | 1 | 0 | 0 | 0 |
| Attribute 13 | 1 | 1 | 0 | 1 | 0 | 0 | 1 | 0 | 0 | 0 |
| Attribute 14 | 1 | 1 | 1 | 0 | 1 | 0 | 0 | 1 | 0 | 1 |
| Attribute 15 | 1 | 1 | 1 | 1 | 1 | 0 | 0 | 1 | 0 | 0 |

FIG. 5

ACCESS PERMISSIONS MODIFICATION

BACKGROUND

Technical Field

Embodiments described herein relate to processors and more particularly, to managing access permissions in a processor.

Description of the Related Art

Computing systems often utilize memory management units (MMUs) for translating virtual addresses into physical addresses. In addition to performing translations, MMUs may also control memory access permissions. Some of the deficiencies with current memory access permissions mechanisms include limited control over kernel read access, limited ability to reduce kernel access to be more restrictive than user access, and updates to access permissions requiring writes to the page tables. Additionally, accesses to the page tables to change permissions are inefficient in terms of throughput and latency.

SUMMARY

Systems, apparatuses, and methods for managing access permissions are contemplated.

In various embodiments, any of a plurality of mechanisms may be utilized for managing access permissions. A first mechanism that may be utilized is a permission management register (PMR). In one embodiment, a processor may include a separate PMR for each privilege level, with the PMR allowing additional restrictions to be imposed for read, write, and/or execute permissions. Initially, software may extract access permissions from the page table structure and then apply various overrides. A subset of bits from the access permissions may then be used as an index into the PMR for the current privilege level to select an attribute field. The attribute field may then specify new read, write, and execute permissions for a given memory page. In one embodiment, the PMR may not allow restrictions to be loosened from the access permissions which were retrieved from the page table structure A second mechanism which may be utilized (in combination with the first mechanism or independently) is a privileged code protection register (PCPR) to implement hardware-enforced protection of kernel code. The PCPR may allow the processor to specify a range of the physical address space that is reserved for kernel binary access. The PCPR may operate as a filter that is applied to the output of the page table permissions, including any overrides. The PCPR may specify an upper and lower boundary of where the kernel code is allowed to reside within physical memory.

In one embodiment, there may be a lock register associated with the PCPR which locks the PCPR after it has been programmed. Once the lock register is set, writes to the PCPR may be prevented until the next reset. For example, in one embodiment, the PCPR may be set and then the lock register engaged during boot time, and then the values in the PCPR will be fixed until the next reset sequence occurs. In one embodiment, the region specified by the PCPR may not be readable or writeable by the kernel or user. Additionally, all physical addresses that are outside of the region specified by the PCPR may not be executable by the kernel. Still further, the user may not be allowed to execute inside the region defined by the PCPR. If the kernel attempts to execute outside of the specified region, if the kernel attempts to read or write within the specified region, or if the user tries to read, write, or execute within the specified region, then a permission fault may be generated.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5 illustrates a table of permissions register values in accordance with one embodiment.

DETAILED DESCRIPTION OF EMBODIMENTS

Figure 1:
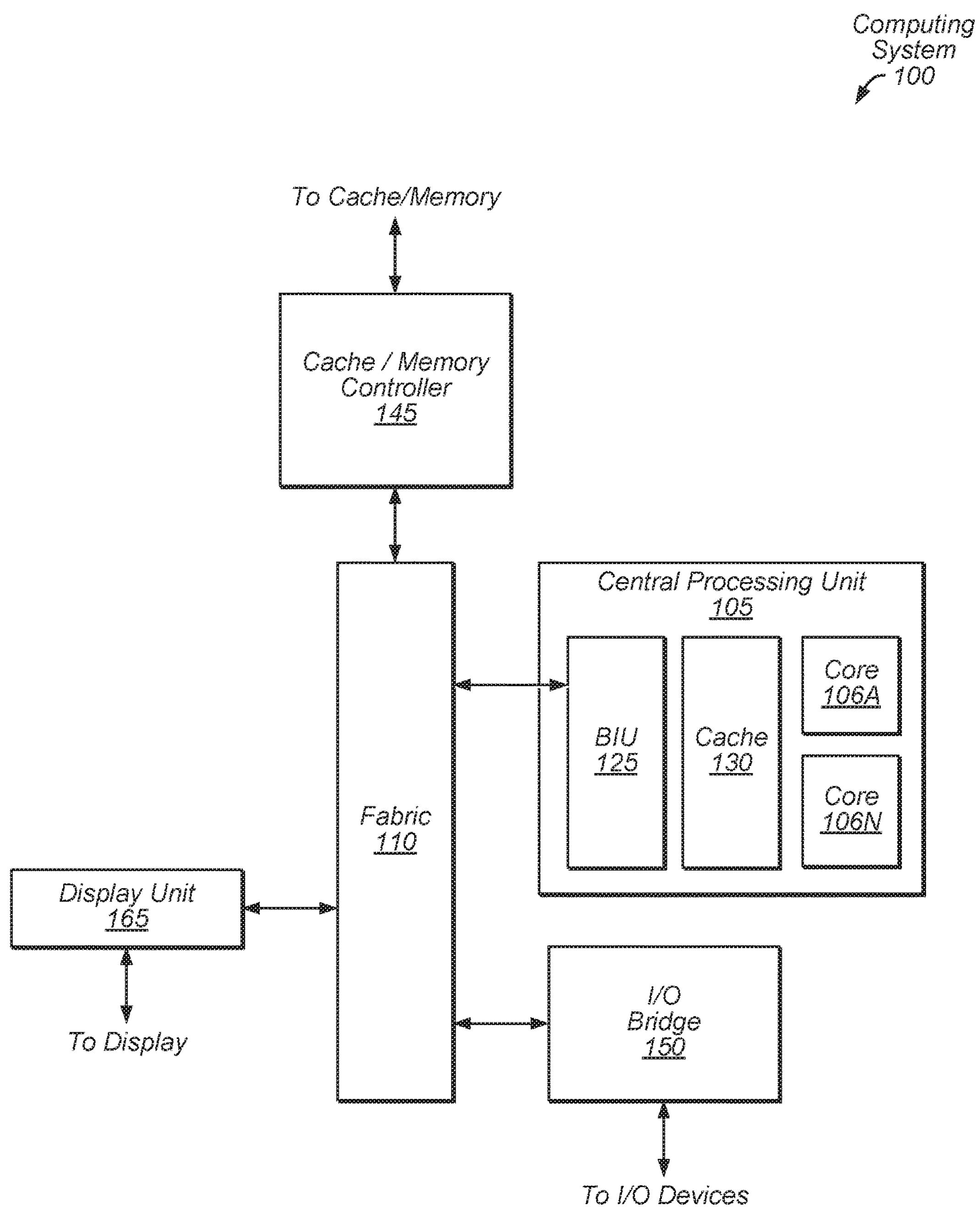
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a computing system 100. In some embodiments, some or all elements of the computing system 100 may be included within a system on a chip (SoC). In some embodiments, computing system 100 may be included in a mobile device. In the illustrated embodiment, the computing system 100 includes fabric 110, central processing unit (CPU) 105, input/output (I/O) bridge 150, cache/memory controller 145, and display unit 165. Although the computing system 100 illustrates central processing unit 105 as being connected to fabric 110 as a sole central processing unit of the computing system 100, in other embodiments, central processing unit 105 may be connected to or included in other components of the computing system 100 and other central processing units may be present. Additionally or alternatively, the computing system 100 may include multiple central processing units 105. The multiple central processing units 105 may include different units or equivalent units, depending on the embodiment.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

In the illustrated embodiment, central processing unit 105 includes bus interface unit (BIU) 125, cache 130, and cores 106A and 106N. In various embodiments, central processing unit 105 may include various numbers of cores and/or caches. For example, central processing unit 105 may include 1, 2, or 4 processor cores, or any other suitable number. In some embodiments, cores 106A and/or 106N may include internal instruction and/or data caches. In some embodiments, a coherency unit (not shown) in fabric 110, cache 130, or elsewhere in computing system 100 may be configured to maintain coherency between various caches of computing system 100. BIU 125 may be configured to manage communication between central processing unit 105 and other elements of computing system 100. Processor cores such as cores 106A and 106N may be configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement universal serial bus (USB) communications, security, audio, and/or low-power always-on functionality, for example. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

Figure 2:
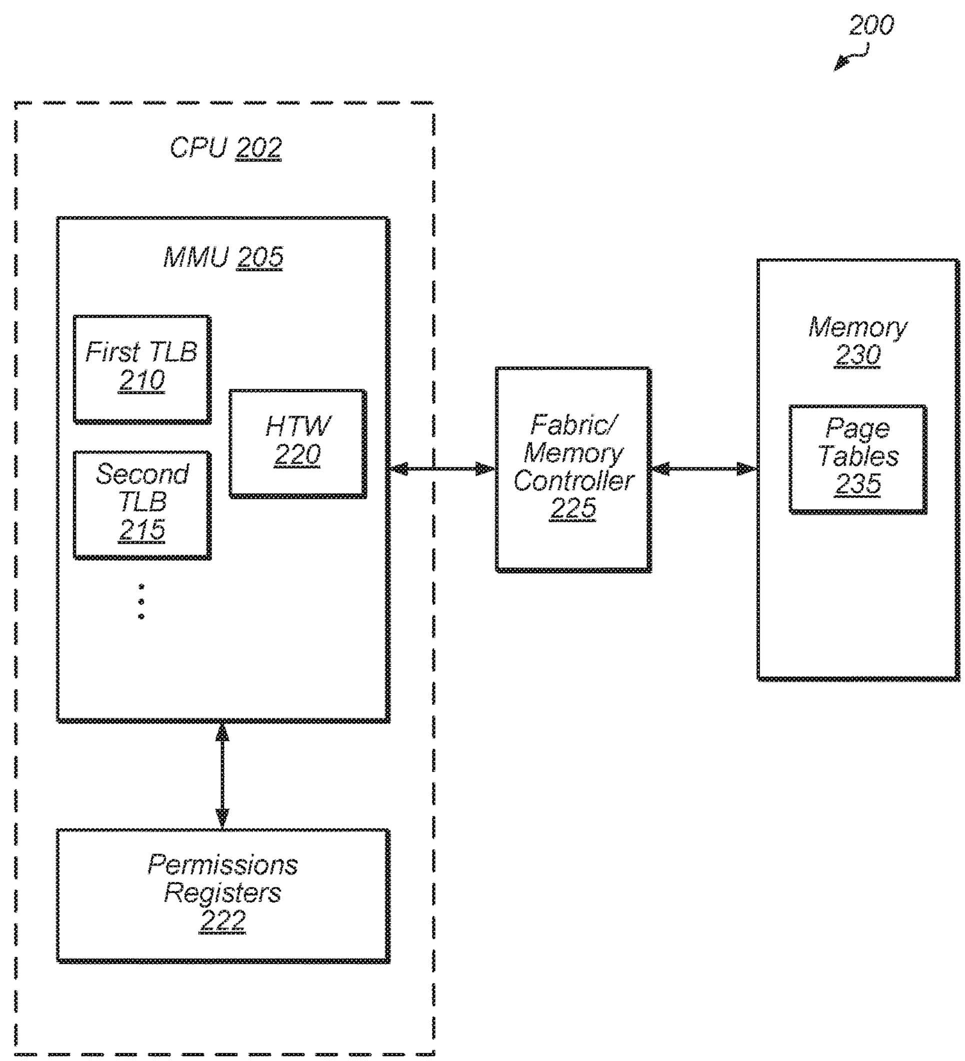
FIG. 2 is a block diagram of one embodiment of a portion of a computing system.

Turning now to FIG. 2, a block diagram of one embodiment of a portion of a computing system 200 is shown. In various embodiments, the circuitry shown in system 200 may be included within computing system 100 (of FIG. 1). System 200 may include CPU 202 coupled to fabric/memory controller 225 which in turn is coupled to memory 230. CPU 202 may include memory management unit (MMU) 205 and permissions registers 222. Memory 230 may have an address space divided into a plurality of memory pages, and memory 230 may include page tables 235 for storing page table data associated with the plurality of memory pages. In various embodiments, the page table data may include a plurality of access permission bits for each of the plurality of memory pages, wherein the access permission bits define access permissions for a respective memory page.

In one embodiment, MMU 205 may include a hardware table walker (HTW) 220, first translation lookaside buffer (TLB) 210, and second TLB 215. First TLB 210 and second TLB 215 are representative of any number and levels of TLBs. TLBs 210 and 215 may be configured to store address translation information, access permissions, status data, and other information for assisting CPU 202 in performing virtual-to-physical address translations and determining access permissions for memory requests. TLBs 210 and 215 may be located in various locations with CPU 202 and each may be split into two or more portions. For example, in one embodiment, there may be separate data and instruction TLBs for performing data and instruction translations, respectively. Additionally, in some embodiments, there may be multiple levels of TLBs for performing translation lookups in a multi-stage TLB hierarchy.

MMU 205 may be configured to retrieve access permissions from first TLB 210 and/or second TLB 215 for memory pages targeted by memory requests of CPU 202. MMU 205 may also be configured to apply overrides (static, dynamic, or otherwise) to the access permissions. Additionally, MMU 205 may be configured to access one or more permissions registers 222 to filter and/or override the access permissions for a given memory request. In various embodiments, permissions registers 222 may include one or more special purpose registers (SPRs) of CPU 202.

For example, in one embodiment, permissions registers 222 may include a separate PMR for different entities within the system, and/or for each privilege level. For example, there may be a first PMR for the kernel (i.e., PL1), a second PMR for the user/applications (i.e., PL0), a third PMR for a hypervisor, a fourth PMR for a guest, and so on. There may be any number of PMRs depending on the embodiment. MMU 205 may retrieve access permissions from the descriptors in the page table data. Then, MMU 205 may apply one or more overrides to the access permissions. Then, MMU 205 may utilize the access permissions, after the override(s) have been applied, as an index into the PMR for the current privilege level. MMU 205 may then retrieve an attribute field from the PMR at an address of the PMR determined by the access permissions (after any overrides have been applied thereto). The attribute field may then be utilized to determine the new access permissions for an address of a given memory request. In one embodiment, each attribute field retrieved from the PMR may include read, write, and execute bits to specify whether the current privilege level is granted read, write, and execute permissions, respectively, to the address. In one embodiment, the PMR may be constructed so that permissions retrieved from the PMR are prevented from being less restrictive than the permissions retrieved from the page table data. Also, the default values for the PMR may be the same as the access permissions used as the index into the PMR. To change the default values, software may write to the PMR to modify the attribute fields stored therein.

In one embodiment, permissions registers 222 may also include a PCPR to define the region of physical address space (i.e., the kernel binary region) where the kernel is allowed to execute code. The PCPR may include an upper range boundary field and a lower range boundary field. The upper range boundary field may define the upper boundary of the kernel binary region, while the lower range boundary field may define the lower boundary of the kernel binary region. In one embodiment, read and write accesses to the PCPR only be performed in privilege level one (PL1). Any PL0 accesses to the PCPR may result in an exception or fault.

Additionally, permissions registers 222 may include a lock register to lock the boundary values of the PCPR. Once the lock register is set, the processor may prevent the PCPR from being modified. In one embodiment, the lock register may only perform a 0→1 transition, with the lock register only able to be cleared by a reset sequence. Still further, permissions registers 222 may include a MMU disabled mode register to provide separate controllability of the PCPR for the case when MMU 205 is disabled. The MMU disabled mode register may also be controlled by the lock register such that the MMU disabled mode register cannot be modified once the lock register is set.

In one embodiment, once the lock register is set to '1', HTW 220 may check the output address of the last level descriptor and determine if the output address falls inside or outside of the kernel code region as defined by the PCPR. For physical addresses (PAs) that are inside the kernel code region, HTW 220 may set one or more permission bits to indicate read-only for corresponding translations which are filled into TLB 210 or 215. This ensures that neither the user nor the kernel can modify the kernel code region. For PAs that are outside the kernel code region, HTW 220 may set one or more permission bits to indicate that the kernel does not have execute permissions for corresponding translations which are filled into TLB 210 or 215. This ensures that the kernel cannot execute outside of the kernel code region. Any write accesses (kernel or user) inside the kernel code region or kernel fetches to PAs outside of the kernel code region may incur a permissions fault.

Figure 3:
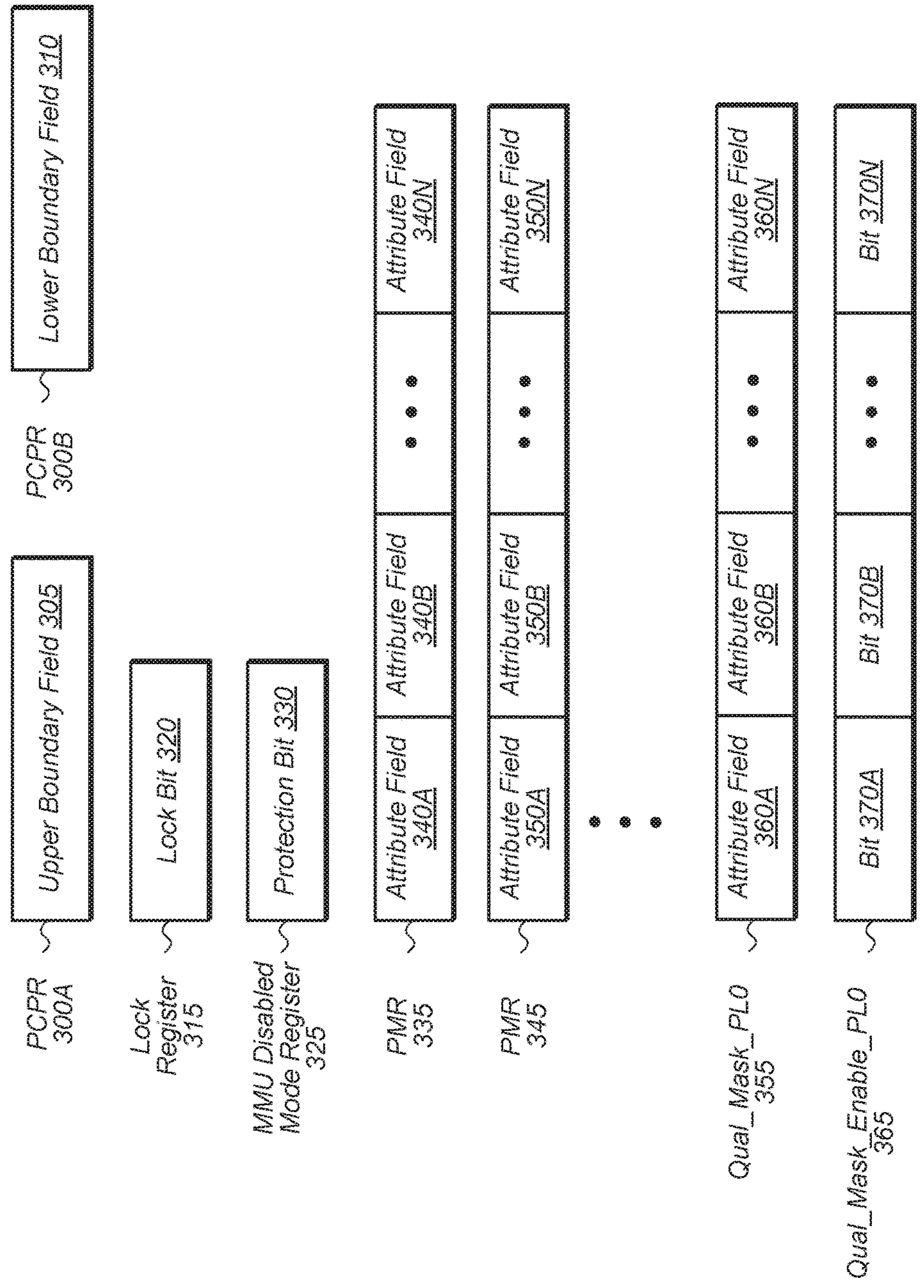
FIG. 3 illustrates a group of permissions registers in accordance with one embodiment.

Referring now to FIG. 3, a group of permissions registers in accordance with one embodiment is shown. One or more of the registers shown in FIG. 3 may be included within permissions registers 222 (of FIG. 2). PCPRs 300A-B are examples of registers which may be used to set upper and lower bounds on the region of physical memory in which the kernel is allowed to execute. In one embodiment, PCPR 300A may include an upper boundary field 305 and PCPR 300B may include a lower boundary field 310. The upper boundary field 305 may indicate an address of physical memory which is the upper limit on where the kernel is allowed to execute, while the lower boundary field 310 may indicate an address of physical memory which is the lower limit on where the kernel is allowed to execute. The number of bits for fields 305 and 310 may vary according to the embodiment. The upper boundary field 305 and lower boundary field 310 may also restrict the ability of the kernel to execute outside of the specified region. Additionally, the processor may prevent the kernel from reading or writing to the region defined by the upper boundary field 305 and lower boundary field 310. In one embodiment, read access to PCPRs 300A-B may be available to PL1 at all times, while any PL0 access to PCPRs 300A-B may result in an exception. In another embodiment, the processor may combine the separate fields for the upper boundary and the lower boundary into a single PCPR.

The processor may also include a lock register 315 which prevents PCPRs 300A-B from being changed once the lock bit 320 is set. In one embodiment, PCPRs 300A-B may be programmed during the boot process, and then lock register 315 may be engaged by setting lock bit 320 after PCPRs 300A-B have been programmed. Once lock bit 320 is set, changes to the PCPRs 300A-B will not be allowed until a reset occurs. In one embodiment, the lock bit 320 may only perform a 0→1 transition, with no software clearing allowed. Accordingly, lock bit 320 may only be cleared by a reset sequence. If the lock bit 320 is set to '1', then PCPRs 300A-B may not be writeable. In one embodiment, writes to PCPRs 300A-B when the lock bit 320 is set to '1' may result in an exception.

In one embodiment, a translation lookaside buffer invalidate (TLBI) operation and a barrier operation may be utilized in order to flush any translations that may have been speculatively cached prior to activation of the lock register 315 since the TLB might contain unprotected kernel code page table entries. In the event that there is a programming error such that a mapped page is only partially contained within the kernel code region specified by the range fields 305 and 310, an instruction abort or data abort may be taken upon access to any address within that page (once the lock bit 320 is set), if the MMU is enabled.

Once the lock bit 320 is set, the HTW (e.g., HTW 220 of FIG. 2) may perform an address range check on the output address of the last level descriptor to determine if the address falls inside or outside of the region specified by the boundary fields 305 and 310. Translations filled into all TLBs with physical addresses (PAs) that are inside the region specified by the boundary fields 305 and 310 may have AP[2] set to '1' specifying the PAs are read-only, ensuring that neither the user nor kernel can modify data inside the specified kernel code region. Translations with PAs that are outside the specified kernel code region may have the Privileged Execute Never (PXN) bit set to '1' so that the kernel cannot execute outside of the specified kernel code region.

In one embodiment, the permissions overrides may apply only to Page/Block descriptors (i.e., at the final level of the hardware table walk (HTW)) and have no effect on Table descriptors. The address range checks may be performed irrespective of the values of permission bits in the page tables. The address range checks may apply irrespective of whether the translation request was for an instruction stream address or data stream address and irrespective of other control register settings. Any write accesses (kernel or user) inside the kernel code region, or kernel fetches to PAs outside of the kernel code region may unconditionally incur a permissions fault as required by non-speculative execution of a program. In one embodiment, the processor hardware may not relax permissions for any pages. For example, a Read-Only, No-Execute page will not be changed to Read-Only, Execute. Similarly, write access may not be provided for pages with Read-Only access. When the lock bit 320 is set to '1', these checks and overrides may apply unconditionally to requests performed when the MMU (e.g., MMU 205 of FIG. 2) is enabled. If the MMU is disabled, then the restrictions may only apply if the lock register 320 and the protection bit 330 of MMU disabled mode register 325 are both set to '1'. Since PCPR 300 protections may be applied when the MMU is disabled, permissions faults may be taken when the MMU is off. In one embodiment, the code reported in these cases may indicate a permission fault at page table level L0. When the MMU is disabled, address size faults due to the lookup virtual address (VA)/PA being out of implemented PA range may take priority over region permission faults.

In various embodiments, the permissions registers may also include PMRs 335 and 345, which are representative of any number of registers which correspond to different privilege levels. For example, in one embodiment, PMR 335 may correspond to privilege level one (PL1) and PMR 345 may correspond to PL0. In other embodiments, there may be more than two PMRs 335 and 345, with a PMR for each PL (e.g., PL3, PL2, PL1, PL0).

In one embodiment, PMRs 335 and 345 may be programmed by software executing in PL1 to enable memory permission restrictions beyond those provided by the page table data. The page table data may include access control bits which specify whether read access, write access, and/or execute access are permitted to a given memory page for different privilege levels. As shown in FIG. 3, PMR 335 may include attribute fields 340A-N and PMR 345 may include attribute fields 350A-N. Attribute fields 340A-N and 350A-N are representative of any number of attribute fields which may be stored in PMRs 335 and 345, respectively.

In various embodiments, each PMR 335 and 345 may include $2^N$ fields indexed by a vector of a subset of 'N' bits returned from the page table data, wherein 'N' is a positive integer. In one embodiment, 'N' may be equal to four, and each register may include 16 fields indexed by the vector of four permission bits returned from a HTW fill. This vector includes access permission bits and execution permission bits from the descriptor. The bits retrieved from the page table entry may possibly be modified by the descriptor's overrides. These values may in turn be modified by PCPRs 300A-B, if enabled.

In one embodiment, the final vector of bits may be used to select an attribute field from the register corresponding to the current privilege level. Each attribute field may include R, W, and X bits which specify whether the addresses with the corresponding attributes are granted Read, Write, and/or Execute permissions, respectively. The reset values of PMRs 335 and 345 may be such that the resulting memory permissions correspond precisely with the instruction set architecture (ISA). In one embodiment, bits in PMRs 335 and 345 which reset to 0 (disabled) may not be set to 1 (enabled). This may be used to enforce the rule that PMRs 335 and 345 may only be used to take away permissions, and never grant more permissions than allowed by the ISA. In one embodiment, PMRs 335 and 345 may only be written from PL1. PMR 335 corresponding to PL0 may be readable in PL0, while PMR 345 corresponding to PL1 may only be readable in PL1.

In one embodiment, agents in PL0 may be allowed to apply additional access restrictions to PL0 accesses. Accordingly, this may enable performance improvements in the dynamic runtime environment. The use of a Just-In-Time (JIT) compiler may involve writing out a data stream to memory and then executing the output as an instruction stream. By using PMRs 335 and 345, it is possible to switch the permissions on the memory in question between Write and Execute quickly, without the overhead of modifying the permissions in the page tables.

In one embodiment, an additional qualification mask register (QUAL_MASK_PL0 355) may be utilized to provide a fine-grained means of removing PL0 permissions. There may be a one-to-one correspondence of QUAL_MASK_PL0 355 with the bits in PMR 335 corresponding to PL0. There may also be a one-to-one correspondence of the bits 370A-N of QUAL_MASK_ENABLE_PL0 365 with the attribute fields 360A-N of QUAL_MASK_PL0 355. If a given bit is set in QUAL_MASK_PL0 355, and the attribute field containing that bit is enabled (via the corresponding bit 370 of APRR QUAL_MASK_ENABLE_PL0 365), then the corresponding bit in PMR 335 may be treated as '0', irrespective of its actual value, thus removing the Read, Write, or Execute permissions it controls. QUAL_MASK_PL0 355 may be readable and writable in PL0 (as well as PL1), but may only take effect as enabled by QUAL_MASK_ENABLE_PL0 365. Once written, the changes to QUAL_MASK_PL0 355 and QUAL_MASK_E-

NABLE_PL0 365 may take effect after a context-synchronizing event such as an instruction barrier.

Figure 4:
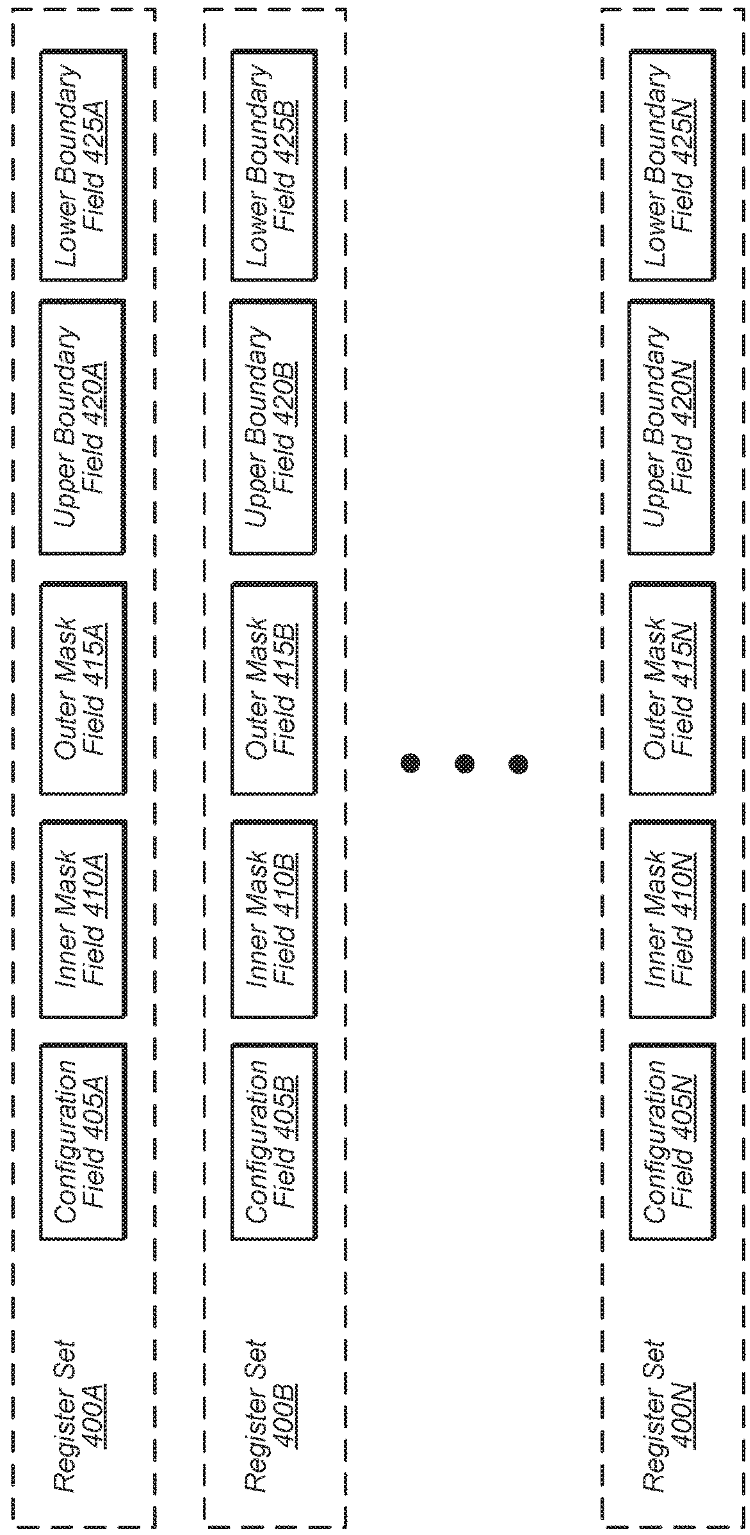
FIG. 4 illustrates a plurality of register sets in accordance with one embodiment.

Turning now to FIG. 4, a plurality of register sets 400A-N in accordance with one embodiment are shown. In one embodiment, register sets 400A-N may be included within permissions registers 222 (of FIG. 2). Each register set 400A-N may include a plurality of registers to specify boundaries and configuration settings for the regions defined by the specified boundaries. For example, in one embodiment, each register set 400A-N may include a configuration field 405A-N, inner mask field 410A-N, outer mask field 415A-N, upper boundary field 420A-N, and lower boundary field 425A-N. Each register set 400A-N may be independent of the other register sets, and may be used to define the settings for a given region. Any number of register sets 400A-N may be implemented in a processor, with the number varying from embodiment to embodiment. For example, in one embodiment, there may be 16 separate register sets allocated for a given processor, although not all 16 may be utilized at a given time. Accordingly, software executing on the processor may allocate or deallocate register sets 400A-N as dictated by the current operating conditions.

Configuration field 405 may be a register specifying the configuration of the corresponding boundary registers 420 and 425. In one embodiment, configuration field 405 may include indication(s) of the privilege level(s) (e.g., PL1, PL0) to which the permissions in the region should be applied. Inner mask field 410 may specify what is allowed (e.g., kernel R/W/X, user R/W/X, hypervisor R/W/X) inside the region defined by the corresponding boundary registers 420 and 425. Outer mask field 415 may specify what is allowed outside the region defined by the corresponding boundary registers 420 and 425. The upper boundary field 420 and lower boundary field 425 may specify the upper and lower boundaries, respectively, of a given region of memory. Each of fields 405, 410, 415, 420, and 425 may include any number of bits for representing the desired information, with the number of bits varying from embodiment to embodiment. Additionally, each of fields 405, 410, 415, 420, and 425 may utilize any suitable encoding scheme for storing the desired information.

In one embodiment, there may be multiple separate regions in memory which are configured to store kernel executable code. For example, there may be eight separate regions which store kernel executable code, and there may be eight separate register sets 400 to define these eight separate regions. Other register sets 400 may define regions which are executable by the user, readable/writeable by the kernel and/or user, executable by a hypervisor, and so on. It is noted that the example of register sets 400A-N shown in FIG. 4 is merely one possible implementation of register sets in accordance with one embodiment. The register sets 400A-N may be utilized independently or in combination with the other mechanisms described herein for operating system (OS) hardening. It should be understood that in other embodiments, register sets 400A-N may include other types and numbers of configurable register fields usable to define the permissions and restrictions in the corresponding regions of memory.

Turning now to FIG. 5, one embodiment of a table 500 of PMR values is shown. Table 500 illustrates the values which may be hard-coded into the PMR for privilege level one (PL1) and the PMR for PL0. Column 505 of table 500 shows the attribute index values which may be extracted from the page table data. In one embodiment, the attribute index which is used to index into a PMR may be four bits in length. In other embodiments, other number of bits from the page table data may be used to index into the PMR.

Column 505 illustrates all 16 possible values for the attribute index [3:0]. The attribute field which may be stored in the PMR for PL1 is shown in column 510 for each attribute index value, and the attribute field which may be stored in the permissions register for PL0 is shown in column 515 for each attribute index value. The attribute fields in columns 510 and 515 may include the read (R), write (W), and execute (X) permissions for the corresponding attribute index value. The attribute fields in the PMR for PL1 and PL0 may be hard-coded to the values shown in columns 510 and 515, respectively, and these values may take effect following a reset sequence. Software may write to the attribute fields in the PMRs and change the initial values shown in columns 510 and 515. However, in one embodiment, software may be prevented from relaxing the permissions from the initial values hard-coded into the PMRs.

Figure 6:
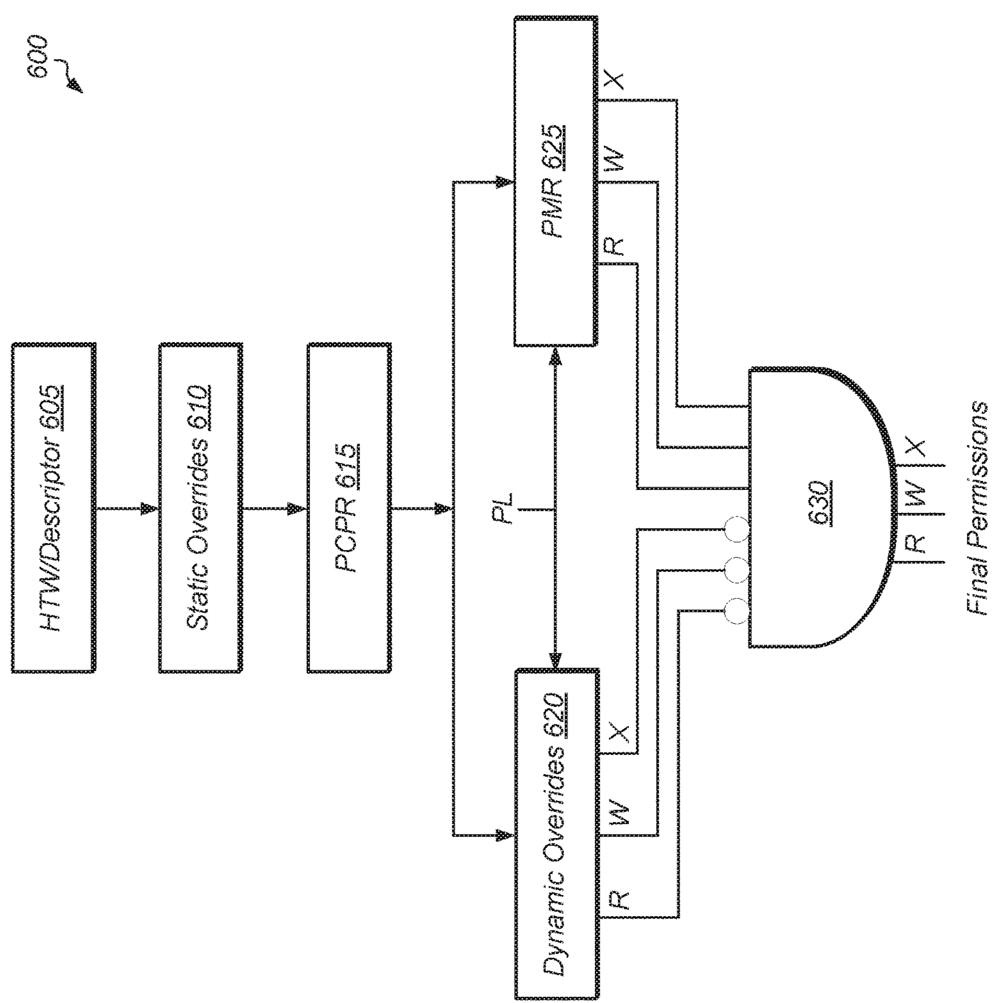
FIG. 6 is a block diagram of one embodiment of a hierarchy of memory permissions.

Referring now to FIG. 6, a block diagram of one embodiment of a hierarchy 600 of memory permissions is shown. At the top of hierarchy 600 may be the page table data, which is represented by hardware table walk (HTW)/descriptor 605. A plurality of bits may be retrieved from the page table data. In one embodiment, there may be four permissions bits retrieved from the page table. In other embodiments, the plurality of bits retrieved from the page table data may include any of various other bits (e.g., address bits, permissions bits, status bits).

Next, overrides 610 (which may be static in one embodiment) may be applied to the plurality of bits retrieved from the page table data. Then, the permissions may be filtered based on the kernel code region specified by PCPR 615. For example, in one embodiment, the processor may prevent the kernel from executing outside of the region defined by PCPR 615, and the processor may prevent read or write access to the region defined by PCPR 615. Accordingly, changes to the permission bits may be made based on the type of access being performed and whether the access is being made inside or outside of the region defined by PCPR 615.

Next, dynamic overrides 620 and filters based on PMR 625 may be applied to the permissions in parallel. A dynamic override refers to a value in a configuration or execution state register that modifies the permissions given by the page table. Both the dynamic overrides 620 and PMR 625 may use the current privilege level (PL) to determine how to process the permissions. In one embodiment, the inputs to the dynamic overrides 620 may include one or more bits from control or status registers. The outputs of dynamic overrides 620 may be the read (R), write (W), and execute (X) bits. The permissions bits may be utilized as an index into PMR 625 for the current PL, with the output of PMR 625 being the R, W, and X bits. The outputs of the dynamic overrides 620 may be inverted and then coupled to logic gate(s) 630, and the outputs of PMR 625 may be coupled to logic gate(s) 630. In one embodiment, logic gate(s) 630 may implement a first AND operation of the inverted R bit from dynamic overrides 620 and the R bit from PMR 625, a second AND operation of the inverted W bit from dynamic overrides 620 and the W bit from PMR 625, and a third AND operation of the inverted X bit from dynamic overrides 620 and the X bit from PMR 625. The R, W, and X outputs of logic gate(s) 630 may be the final permissions. In other embodiments, logic gate(s) 630 may utilize other combinatorial logic to perform other combinations of logical operations to the outputs of dynamic overrides 620 and PMR 625.

It should be understood that the hierarchy of memory permissions shown in FIG. 6 is merely one example of a hierarchy 600 of memory permissions filtering which may be performed. The ordering of components of hierarchy 600 may vary in other embodiments. Additionally, in other embodiments, other structures of hierarchies with one or more additional components and/or omitting one or more of the components shown in FIG. 6 may be utilized.

Figure 7:
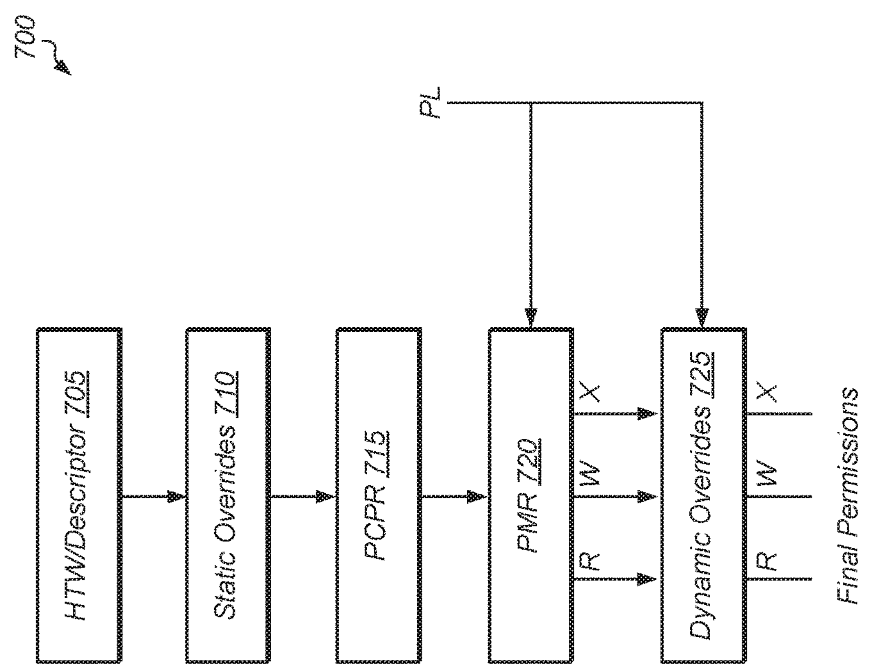
FIG. 7 is a block diagram of another embodiment of hierarchy of memory permissions.

Turning now to FIG. 7, a block diagram of another embodiment of a hierarchy 700 of memory permissions is shown. Similar to hierarchy 600 (of FIG. 6), hierarchy 700 may include, in the following order, HTW/descriptor 705, overrides 710 (static or otherwise), followed by PCPR 715. After PCPR 715, the permissions may be filtered by PMR 720, and then the R, W, and X outputs from PMR 720 may be coupled to dynamic overrides 725. The R, W, and X outputs of dynamic overrides 725 may be the final permissions. This is in contrast to hierarchy 600 where dynamic overrides 620 and filtering by PMR 625 were performed in parallel on the permissions outputs of PCPR 615. Hierarchy 700 is intended to represent another embodiment of a hierarchy of memory permissions that may be utilized to apply various filters and overrides to permissions retrieved from page table data. Other hierarchies of memory permissions are possible and are contemplated.

Figure 8:
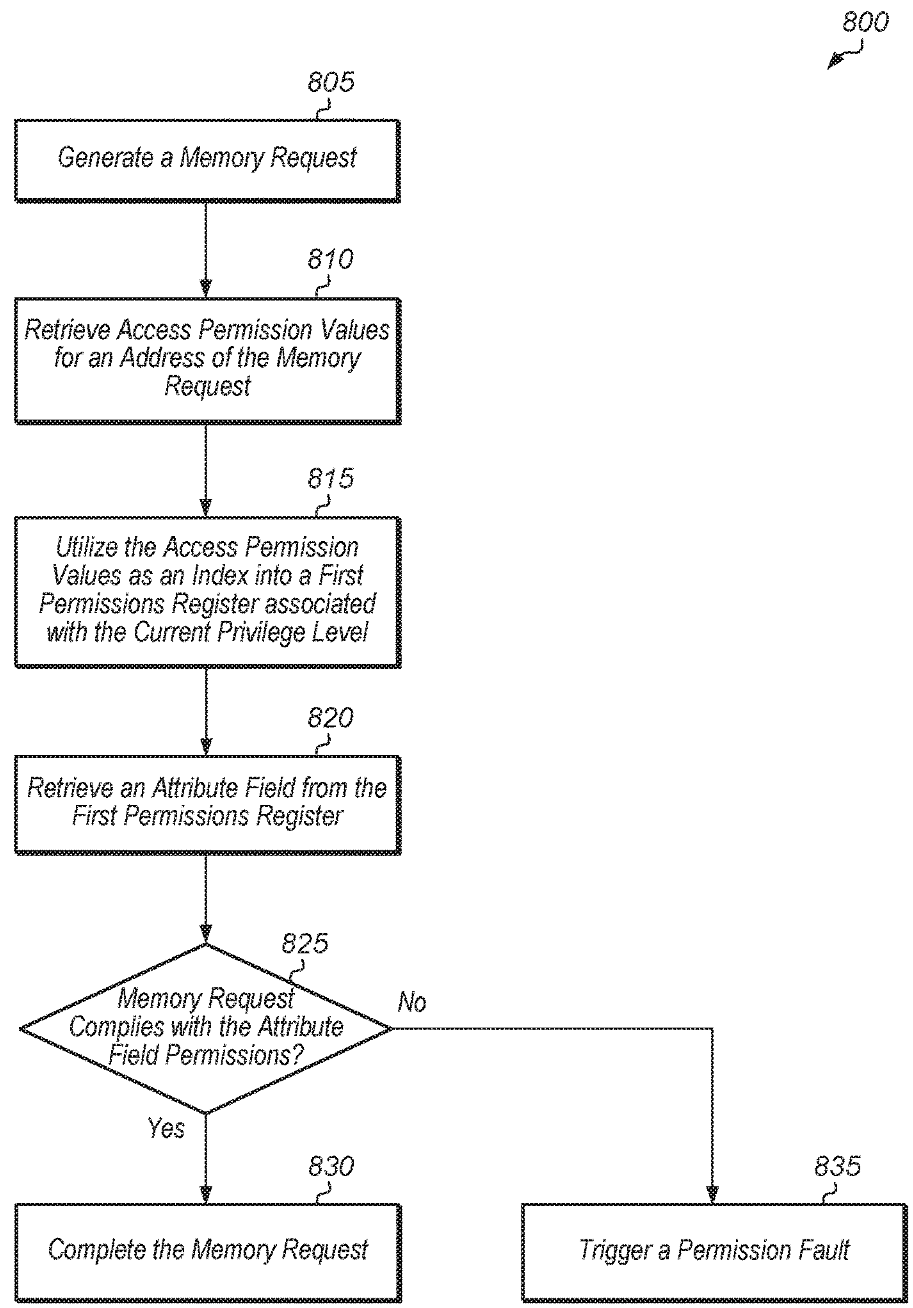
FIG. 8 is a generalized flow diagram illustrating one embodiment of a method for using page table data as an index into a permissions register.

Referring now to FIG. 8, one embodiment of a method 800 for using page table data as an index into a permissions register is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 800.

A processor may generate a memory request (block 805). In various embodiments, the processor may be included within a host device, wherein the host device is a smartphone, tablet, laptop computer, desktop computer, watch, server, programmable consumer electronic device, set-top box, television, satellite receiver, or other electronic device or computing system. In response to generating the memory request, the MMU of the processor may retrieve, from the page table data, the access permission values for an address of the memory request (block 810). Next, the processor may utilize the access permission values as an index into a first permissions register (e.g., PMR) associated with the current privilege level (block 815). Then, the processor may retrieve an attribute field from the first permissions register (block 820). Then, the processor may determine if the memory request complies with the permissions retrieved from the attribute field (conditional block 825). If the memory request complies with the permissions retrieved from the attribute field (conditional block 825, "yes" leg), then the memory request may be completed (block 830). If the memory request does not comply with the permissions retrieved from the attribute field (conditional block 825, "no" leg), then a permission fault may be triggered (block 835). After blocks 830 and 835, method 800 may end.

Figure 9:
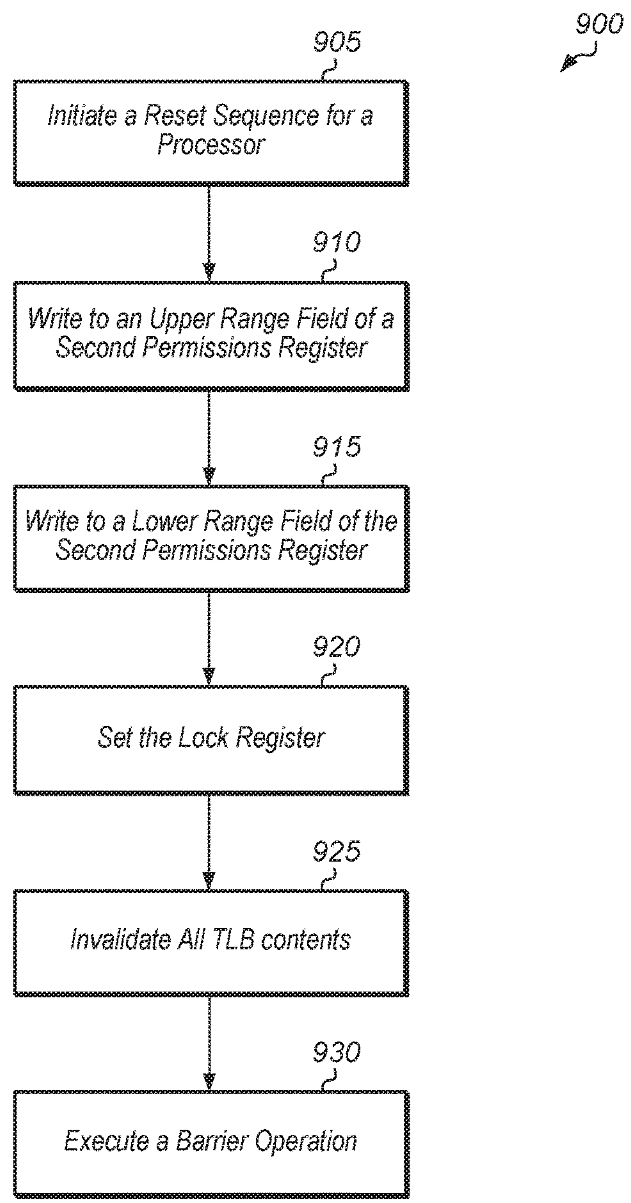
FIG. 9 is a generalized flow diagram illustrating one embodiment of a method for programming a permissions register.

Turning now to FIG. 9, one embodiment of a method 900 for programming a second permissions register is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 900.

A reset sequence may be initiated for a processor (block 905). When the reset sequence is initiated, the lock register for the second permissions register (e.g., PCPR) may be cleared, allowing the second permissions register to be programmed. Next, the processor may write to an upper range field of the second permissions register (block 910). Also, processor may write to a lower range field of the second permissions register (block 915). It is noted that blocks 910 and 915 may be performed in reverse order. The processor may program the upper and lower values of the second permissions register with physical address values so that the kernel executable fits in the range specified by the second permissions register.

Next, the processor may set the lock register (block 920). By setting the lock register, the processor is preventing the second permissions register range fields from being changed. Then, the processor may invalidate all TLB contents (block 925). Next, the processor may execute a barrier operation (block 930). After block 930, method 900 may end.

Figure 10:
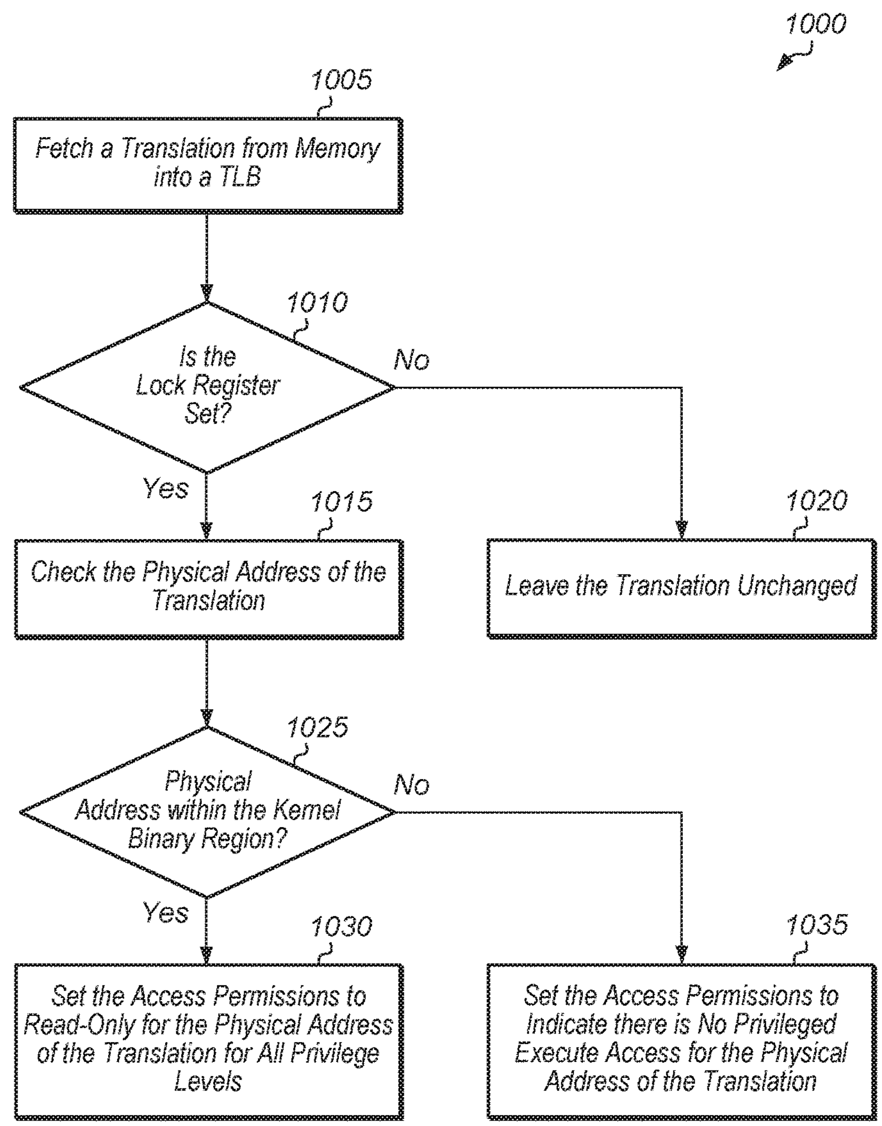
FIG. 10 is a generalized flow diagram illustrating one embodiment of a method for implementing a permissions register.

Referring now to FIG. 10, one embodiment of a method 1000 for implementing a PCPR register is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1000.

A processor may fetch a translation from memory into a TLB (block 1005). If the lock register is set (conditional block 1010, "yes" leg), then the processor may check the physical address of the translation (block 1015). If the lock register is not set (conditional block 1010, "no" leg), then the processor may leave the translation unchanged (block 1020).

After block 1015, the processor may determine if the physical address of the translation falls within the kernel binary region (conditional block 1025). In one embodiment, determining if the physical address falls within the kernel binary region may comprise determining if the physical address is less than the upper address field of the PCPR and greater than the lower address field of the PCPR. If the physical address falls within the kernel binary region (conditional block 1025, "yes" leg), then the processor may set the access permissions to read-only for the physical address of the translation for all privilege levels (block 1030). By marking the translation as read-only, the processor is ensuring that neither the user nor the kernel (or any other privilege level) can modify the kernel binary region. If the physical address falls outside of the kernel binary region (conditional block 1025, "no" leg), then the processor may set the access permissions to indicate there is no privileged execute access for the physical address of the translation (block 1035). It is noted that blocks 1030 and 1035 may be performed irrespective of the access permissions values in the descriptor. After blocks 1020, 1030, and 1035, method 1000 may end.

Figure 11:
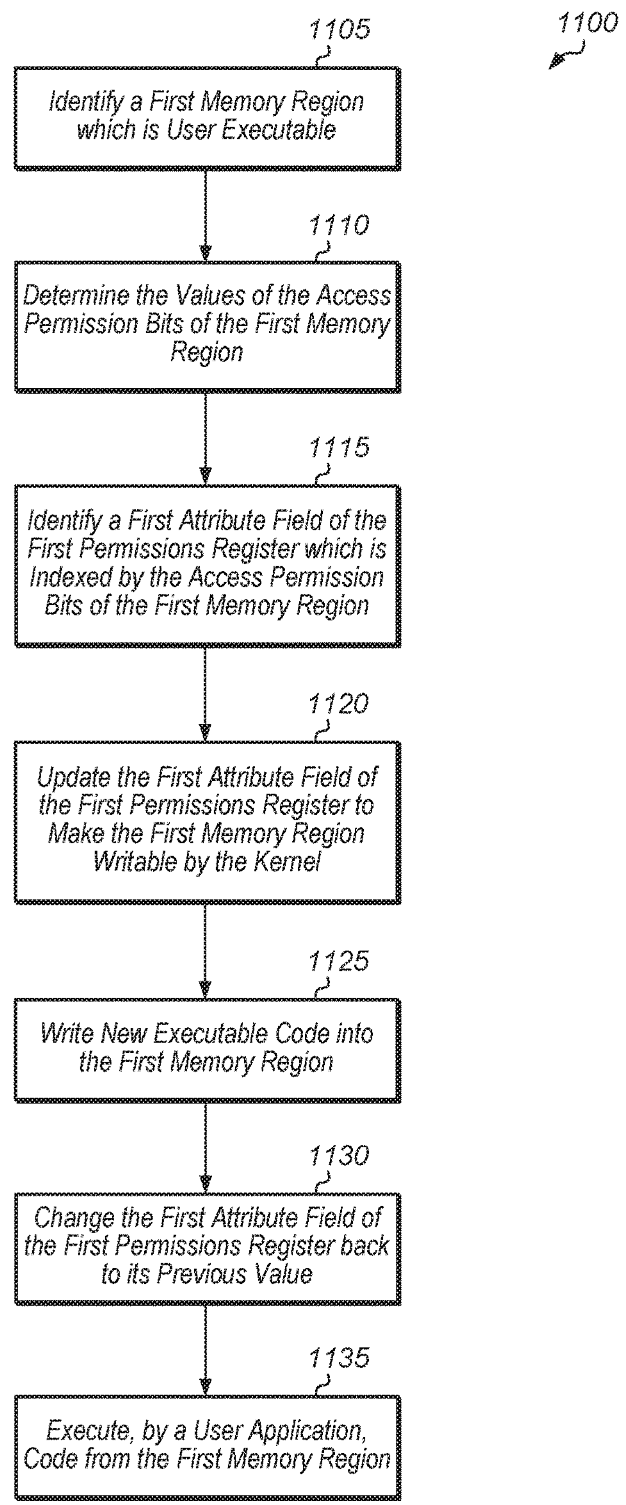
FIG. 11 is a generalized flow diagram illustrating one embodiment of a method for utilizing just-in-time (JIT) code.

Referring now to FIG. 11, one embodiment of a method 1100 for utilizing just-in-time (JIT) code is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1100.

A processor may identify a first memory region which is user executable (block 1105). Next, the processor may determine the values of the access permission bits of the first memory region (block 1110). The processor may retrieve the access permission bits of the first memory region from the page table data in order to determine their values. In one embodiment, the access permission bits may include four bits. In other embodiments, the access permission bits may include other number of bits from the page table data and/or other data. Then, the processor may identify a first attribute field of the first permissions register (e.g., PMR) which is indexed by the access permission bits of the first memory region (block 1115).

Next, the processor may update the first attribute field of the first permissions register to make the first memory region writable by the kernel (block 1120). Then, the kernel may write new executable code into the first memory region (block 1125). Next, the processor may change the first attribute field of the first permissions register back to its previous value (block 1130). Then, a user application may execute code from the first memory region (block 1135). After block 1135, method 1100 may end.

Figure 12:
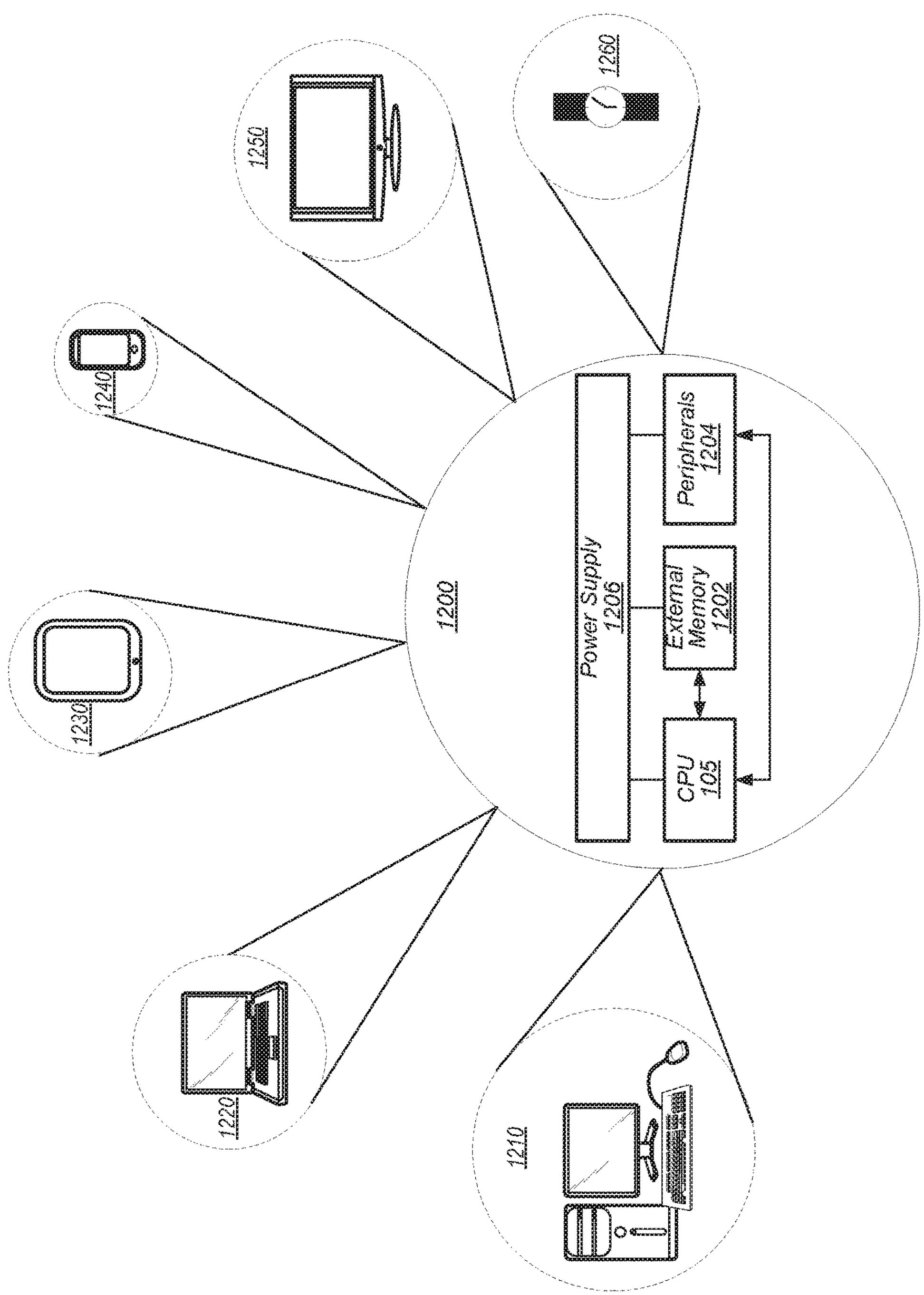
FIG. 12 is a block diagram of one embodiment of a system.

Referring next to FIG. 12, a block diagram of one embodiment of a system 1200 is shown. As shown, system 1200 may represent chip, circuitry, components, etc., of a desktop computer 1210, laptop computer 1220, tablet computer 1230, cell or mobile phone 1240, television 1250 (or set top box configured to be coupled to a television), wrist watch or other wearable item 1260, or otherwise. Other devices are possible and are contemplated. In the illustrated embodiment, the system 1200 includes at least one instance of CPU 105 (of FIG. 1) coupled to an external memory 1202. In various embodiments, CPU 105 may be included within a system on chip (SoC) or integrated circuit (IC) which is coupled to external memory 1202, peripherals 1204, and power supply 1206.

CPU 105 is coupled to one or more peripherals 1204 and the external memory 1202. A power supply 1206 is also provided which supplies the supply voltages to CPU 105 as well as one or more supply voltages to the memory 1202 and/or the peripherals 1204. In various embodiments, power supply 1206 may represent a battery (e.g., a rechargeable battery in a smart phone, laptop or tablet computer). In some embodiments, more than one instance of CPU 105 may be included (and more than one external memory 1202 may be included as well).

The memory 1202 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMIVIs), etc. Alternatively, the devices may be mounted with an SoC or IC containing CPU 105 in a chip-on-chip configuration, a package-on-package configuration, or a multi-chip module configuration.

The peripherals 1204 may include any desired circuitry, depending on the type of system 1200. For example, in one embodiment, peripherals 1204 may include devices for various types of wireless communication, such as wifi, Bluetooth, cellular, global positioning system, etc. The peripherals 1204 may also include additional storage, including RAM storage, solid state storage, or disk storage. The peripherals 1204 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:

two or more permissions registers; and one or more page tables;

wherein the processor is configured to:

retrieve a plurality of bits from page table data associated with a first address;

utilize the plurality of bits as an index into a first permissions register of the two or more permissions registers;

retrieve a first attribute field from the first permissions register at a location indexed by the plurality of bits;

utilize the first attribute field to determine access permissions to the first address; and override the access permissions with different access permissions based on an access to a second permissions register of the two or more permissions registers, wherein the second permissions register defines an address range within which a kernel is allowed to execute.

2. The processor as recited in claim 1, wherein the override is in response to determining the first address corresponds to a restricted address region.

3. The processor as recited in claim 2, wherein the second permissions register includes an upper range boundary and a lower range boundary for the region where the kernel is allowed to execute, and wherein the processor is further configured to prevent the kernel from reading from or writing to the region defined by the upper range boundary and the lower range boundary.

4. The processor as recited in claim 3, wherein the processor is further configured to prevent the kernel from executing outside of the region defined by the upper range boundary and the lower range boundary.

5. The processor as recited in claim 4, wherein the processor is further configured to prevent the second permissions register from being written to responsive to a lock bit being set.

6. The processor as recited in claim 1, wherein the access permissions comprise read, write, and execute permissions.

7. The processor as recited in claim 1, wherein the plurality of bits include two access permission bits, an execute never bit, and a privileged access never bit.

8. A method comprising:

retrieving a plurality of bits from page table data associated with a first address;

utilizing the plurality of bits as an index into a first permissions register;

retrieving a first attribute field from the first permissions register at a location indexed by the plurality of bits;

utilizing the first attribute field to determine access permissions to the first address; and overriding the access permissions with different access permissions based on an access to a second permissions register, wherein the second permissions register defines an address range within which a kernel is allowed to execute.

9. The method as recited in claim 8, wherein the overriding is in response to determining the first address corresponds to a restricted address region.

10. The method as recited in claim 9, wherein the second permissions register includes an upper range boundary and a lower range boundary for the region where the kernel is allowed to execute, the method further comprising preventing the kernel from reading from or writing to the region defined by the upper range boundary and the lower range boundary.

11. The method as recited in claim 10, further comprising preventing the kernel from executing outside of the region defined by the upper range boundary and the lower range boundary.

12. The method as recited in claim 11, further comprising preventing the second permissions register from being written to responsive to a lock bit being set.

13. The method as recited in claim 8, wherein the access permissions comprise read, write, and execute permissions.

14. The method as recited in claim 8, wherein the plurality of bits include two access permission bits, an execute never bit, and a privileged access never bit.

15. A computing system comprising:

a memory; and a processor comprising:

two or more permissions registers; and one or more page tables;

wherein the processor is configured to:

retrieve a plurality of bits from page table data associated with a first address;

utilize the plurality of bits as an index into a first permissions register of the two or more permissions registers;

retrieve a first attribute field from the first permissions register at a location indexed by the plurality of bits;

utilize the first attribute field to determine access permissions to the first address; and override the access permissions with different access permissions based on an access to a second permissions register of the two or more permissions registers, wherein the second permissions register defines an address range within which a kernel is allowed to execute.

16. The computing system as recited in claim 15, wherein the override is in response to determining the first address corresponds to a restricted address region.

17. The computing system as recited in claim 16, wherein the second permissions register includes an upper range boundary and a lower range boundary for the region where the kernel is allowed to execute, and wherein the processor is further configured to prevent the kernel from reading from or writing to the region defined by the upper range boundary and the lower range boundary.

18. The computing system as recited in claim 17, wherein the processor is further configured to prevent the kernel from executing outside of the region defined by the upper range boundary and the lower range boundary.

19. The computing system as recited in claim 18, wherein the processor is further configured to prevent the second permissions register from being written to responsive to a lock bit being set.

20. The computing system as recited in claim 15, wherein the access permissions comprise read, write, and execute permissions.

* * * * *